UNITED STATES PATENT OFFICE 3,842,131
Patented Oct. 15, 1974

3,842,131
PROCESS FOR CONDUCTING A DIELS-ALDER REACTION
Yoshihiro Watanabe, Seiji Suzuki, Tooru Tokumaru, and Hiroshi Yoshihara, Osaka, and Takeshi Yamahara, Hyogo, Japan, assignors to Sumitomo Chemical Company, Limited, Osaka, Japan
No Drawing. Filed May 22, 1973, Ser. No. 362,706
Int. Cl. C07c 13/54
U.S. Cl. 260—666 PY                    4 Claims

ABSTRACT OF THE DISCLOSURE

A process for conducting a Diels-Alder reaction by reacting a conjugated diolefin with an olefin having an activated double bond in which either of the reactants is fed dividedly through at least two feeding inlets into a tubular reactor is disclosed.

BACKGROUND OF THE INVENTION

(1) Field of the Invention

This invention relates to a process for conducting a Diels-Alder reaction and, more particularly, it relates to a process for conducting a Diels-Alder reaction by feeding dividedly the reactants in a continuous flow through at least two inlets into a tubular reactor.

(2) Description of the Prior Art

The Diels-Alder reaction is characterized by the 1,4-addition of an olefin having an activated double bond (hereinafter referred to as "olefin") to a conjugated diolefin. It is preferable to conduct this reaction at a relatively high temperature, for example, at a temperature of 200° C. or higher so that a reasonable reaction rate can be obtained. However, if the reaction is conducted at these higher temperatures, polymerization of the diolefin or the olefin tends to occur and, in addition, a wide variety of by-products may be produced due to the formation of products other than the desired product in the Diels-Alder reaction. Thus, the Diels-Alder reaction at higher temperatures would be disadvantageous in that it increases the cost of raw materials and requires a large scale apparatus for purification of the desired product.

Various processes have heretofore been known for preventing the formation of by-products in the Diels-Alder reaction at higher temperatures. For example, the addition of various polymerization inhibitors to the Diels-Alder reaction system is effective for preventing the formation of undesirable polymers, but any process for preventing the formation of by-products other than the desired product of the Diels-Alder reaction has not yet been proposed.

SUMMARY OF THE INVENTION

An object of this invention is to provide to process for conducting the Diels-Alder reaction which prevents the formation of such by-products thereby increasing the yield of the desired Diels-Alder reaction product.

As a result of extensive researches for accomplishing the above object, the inventors have found that the formation of polymers of conjugated polyolefins or olefins and the formation of by-products other than the desired Diels-Alder reaction product can effectively be prevented by feeding dividedly the reactants in a continuous flow through at least two inlets into a tubular reactor.

As a process for increasing the yield of the desired product in the Diels-Alder reaction, there has heretofore been known to the process of, for example, adding a polymerization inhibitor to the reaction system of the Diels-Alder reaction. It was also known that the desired Diels-Alder reaction can be promoted by using a certain type of catalyst. However, it is quite surprising that the Diels-Alder reaction can be controlled by feeding dividedly the reactants into the reaction system according to the present invention.

That is, the present invention provides a process for conducting a Diels-Alder reaction which comprises contacting a conjugated diolefin with an olefin as reactants by feeding dividedly the reactants in a continuous flow through at least two inlets into the Diels-Alder reaction system.

The reactants to be fed dividedly in the process of this invention can be the conjugated diolefin or the olefin as defined previously alone or a mixture of the conjugated diolefin and the olefin.

Generally, the process of this invention can efficiently be conducted by feeding dividedly either of the reactants which is relatively reactive and tends to form polymers or the reactant which is apt to form by-products other than the desired product by side-reactions through feeding inlets into a tubular reactor having at least two feeding inlets.

The conjugated diolefins which are suitable for use in the process of the present invention are represented by the following formula (I):

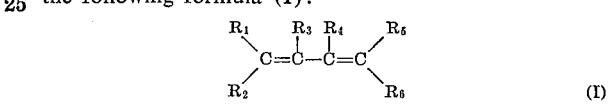

(I)

wherein $R_1$, $R_2$, $R_3$, $R_4$, $R_5$ and $R_6$ each represents hydrogen, an alkyl group such as methyl, ethyl, n-propyl, isopropyl, n-pentyl, iso-pentyl, hexyl and heptyl, an aryl group such as phenyl and naphthyl, an aralkyl group such as tolyl and xylyl, an alkoxy group such as methoxy and ethoxy, an acyl group such as acetyl, an oxycarbonyl group or other groups which do not take part in the reaction with a polymerization inhibitor. $R_1$, $R_2$, $R_3$, $R_4$, $R_5$ and $R_6$ may all be the same or different, or, any pairs of them may be suitably connected with each other to form rings. These diolefins include, for example, 1,3-butadiene, isoprene, 1,3-pentadiene, 2,4-hexadiene, 2,3-dimethylbutadiene, 1-phenylbutadiene as well as cyclic diolefins such as cyclopentadiene and methylcyclopentadiene.

The olefins which are suitable for use in the process of the present invention are represented by the following formula (II):

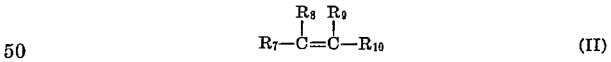

(II)

wherein $R_7$ represents a group which is capable of activating the double bond in the formula (II), i.e., a double bond-containing group or an oxygen-containing group such as an alkenyl group (e.g., vinyl, propenyl, butenyl, pentenyl, etc.), an aryl group (e.g., phenyl, naphthyl, etc.), an aralkyl group (e.g., tolyl, xylyl, etc.), an alkoxy group (e.g., methoxy, ethoxy, propoxy, etc.), or a carbonyl-containing group (e.g., an aldehyde group, an acyl group, an oxycarbonyl group, etc.), and $R_8$, $R_9$ and $R_{10}$ each represents hydrogen, a lower alkyl group such as methyl, ethyl, propyl, butyl and the like, or the above described alkenyl, aryl, alkoxy, carbonyl-containing group or the like. Of course, $R_7$, $R_8$, $R_9$ and $R_{10}$ may all be the same or different. These compounds include 1,3-butadiene, styrene, vinyl acetate, crotonaldehyde, methyl vinyl ether, methyl vinyl ketone, vinylnaphthalene and the like, and further include cyclic olefins such as cyclopentadiene, dicyclopentadiene, vinylcyclohexene.

The reaction of the present invention may generally be conducted in the presence of an inert solvent such as n-heptane and benzene, but such a solvent need not necessarily be used.

The reaction temperature used in the Diels-Alder reaction of this invention is preferably in the range of from −10° C. to 250° C. or higher than that depending upon the reactivity of the particular reactants to be charged, but the reaction temperature is not critical in the process of this invention. However, it is to be understood that the process of this invention is particularly effective in case where a number of side reactions may take place at higher temperatures and the rate of side reaction is high.

Although polymerization inhibitors may sometimes be used in a specific Diels-Alder reaction for inhibiting the abnormal polymerization reaction due to side reaction, the process of the present invention can be applied to the above Diels-Alder reaction regardless of the presence or absence of such polymerization inhibitors.

In the process of this invention, the reactants which are fed dividedly into the Diels-Alder reaction system can be selected depending upon a relative reactivity of the reactants used in the reaction, a molar ratio of the conjugated diolefin to the olefin to be fed, a reaction temperature, etc. For example, in the production of vinylnorbornene and tetrahydroindene in the Diels-Alder reaction using cyclopentadiene as a conjugated diolefin and butadiene as an olefin, vinylcyclohexene, cyclooctadiene and polymers are generally produced as main by-products. When an excess amount of butadiene is fed in this reaction, the amount of the by-products, vinylcyclohexene and cyclooctadiene which are dimers of butadiene, usually increases drastically. However, when an excess amount of butadiene is divided into two or more portions and fed through two or more inlets in the reaction zone, the product amount of the desired vinylnorbornene and tetrahydroindene can be increased by 5 to 20% and, moreover, the amount of by-product, vinylcyclohexene and cyclooctadiene, can be decreased by 20 to 30%, as compared with the amounts obtained by feeding an excess amount of butadiene all at once.

The present invention is further illustrated by the following examples and comparative examples, but they are not to be construed as limiting the scope of this invention.

EXAMPLE 1

A Diels-Alder reaction was conducted using dicyclopentadiene and butadienes as reactants and a 0.32 l. tubular reactor (inside diameter, 0.6 cm.) having two feeding inlets for the reactants (hereinafter referred to as reactor). The reactor had been heated at a temperature of 210° C., and the reaction pressure was adjusted to 60 kg./cm.$^2$ gauge. Butadiene, dicyclopentadiene and N-nitrosodiphenylamine as a polymerization inhibitor (hereinafter the same inhibitor was used) were fed from the first inlet at the rate of 723 g./hr., 1245 g./hr. and 2 g./hr., respectively. Additional butadiene and the polymerization inhibitor were fed at the rate of 723 g./hr. and 0.7 g./hr., respectively, from the second inlet which is located at ¼ of the total length of the reactor from the first inlet (assuming the total length of the reactor is 1). The reaction products obtained under such reaction conditions are 680 g./hr. of vinylnorbornene, 270 g./hr. of vinylcyclohexene, 17 g./hr. of cyclooctadiene, 283 g./hr. of tetrahydroindene and 419 g./hr. of a high boiling compound. The increase in yield of vinylnorbornene as compared with the result obtained in the following Comparative Example 1 was 18%.

COMPARATIVE EXAMPLE 1

The reactants were fed into the same reactor as used in Example 1 from only the first inlet. The feeding rates of the reactants were 1447 g./hr. of butadiene, 1245 g./hr. of dicyclopentadiene and 2.7 g./hr. of the polymerization inhibitor. The reaction product thus obtained was found to be 578 g./hr. of vinylnorbornene, 272 g./hr. of vinylcyclohexene, 17 g./hr. of cyclooctadiene, 197 g./hr. of tetrahydroindene and 290 g./hr. of high boiling compounds.

EXAMPLE 2

A tubular reactor (0.6 cm. inside diameter) having five feeding inlets for reactants and a content volume of 0.28 l. was maintained at a temperature of 210° C. The feeding inlets are located in such a manner, that, assuming the total length of the reactor is 1, the first inlet is at the beginning, the second to fifth inlets are at 1/10, 2.3/10, 4/10 and 5.8/10 of the total length of the reactor from the first inlet, respectively. The reactants were fed into the reactor through the first inlet at a rate of 289 g./hr. of butadiene, 1245 g./hr. of dicyclopentadiene and 1.5 g./hr. of the polymerization inhibitor and through each of other inlets (second to fifth inlets) at a rate of 289 g./hr. of butadiene and 0.3 g./hr. of the polymerization inhibitor. The total amount of butadiene charged was 1445 g./hr. The reaction product obtained by the reaction performed under a pressure of 60 kg./cm.$^2$ gauge was found to be 707 g./hr. of vinylnorbornene, 258 g./hr. of vinylcyclohexene, 16 g./hr. of cyclooctadiene, 331 g./hr. of tetrahydroindene and 479 g./hr. of high boiling compounds. In comparison with the results shown in Comparative Example 2 below, the increase in yield of vinylnorbornene was found to be 8%, whereas the decrease in yield of vinylcyclohexene and cyclooctadiene was found to be about 20%, respectively.

COMPARATIVE EXAMPLE 2

The reactants were fed into the same reactor as used in Example 2 from only the first inlet. The feeding rates of the reactants were 1445 g./hr. of butadiene, 1245 g./hr. of dicyclopentadiene and 2.7 g./hr. of the polymerization inhibitor. The reaction was conducted at a temperature of 210° C. under a pressure of 60 kg./cm.$^2$, and the reaction product thus obtained was found to be 653 g./hr. of vinylnorbornene, 314 g./hr. of vinylcyclohexene, 20 g./hr. of cyclooctadiene, 260 g./hr. of tetrahydroindene and 400 g./hr. of high boiling compounds.

EXAMPLE 3

In the same manner as described in Example 2, a tubular reactor (0.6 cm. inside diameter) having five feeding inlets for reactans and a content volume of 0.22 l. was maintained at a temperature of 210° C. The feeding inlets are located at in such a manner that, assuming the total length of the reactor is 1, the first inlet is at the beginning, the second to fifth inlets are at 1.3/10, 3/10, 5/10, and 7.3/10 of the total length of the reactor, respectively. The reactants were fed into the reactor through the first inlet at a rate of 289 g./hr. of buadiene, 1245 g./hr. of dicyclopentadiene and 1.5 g./hr. of the polymerization inhibitor and through each of the other inlets (second to fifth inlets) at a rate of 289 g./hr. of butadiene and 0.3 g./hr. of the polymerization inhibitor. The total amount of butadiene charged was 1445 g./hr. The reaction product obtained by the reaction performed under a pressure of 60 kg./cm.$^2$ was found to be 646 g./hr. of vinylnorbornene, 210 g./hr. of vinylcyclohexene, 13 g./hr. of cyclooctadiene, 247 g./hr. of tetrahydroindene and 335 g./hr. of high boiling compounds. In comparison with the results shown in Comparative Example 3 below, the increase in yield of vinynorbornene was found to be 6%, whereas decrease in yield of vinylcyclohexene and cyclooctadiene was found to be 28%, respectively.

COMPARATIVE EXAMPLE 3

The reactants were fed into the same reactor as used in Example 3 from only the first inlet. The feeding rates of the reactants were 1445 g./hr. of butadiene, 1245 g./hr. of dicyclopentadiene and 2.7 g./hr. of the polymerization inhibitor. The reaction was conducted at a temperature of 210° C. under a pressure of 60 kg./cm.$^2$, and the reaction product thus obtained was found to be 610 g./hr. of vinylnorbornene, 289 g./hr. of vinylcyclohexene, 18 g./hr. of cyclooctadiene, 220 g./hr. of tetrahydroindene and 328 g./hr. of high boiling compounds.

While the invention has been described in detail and with reference to specific embodiments thereof, it will be apparent to one skilled in the art that various changes and modifications can be made therein without departing from the spirit and scope thereof.

What is claimed is:

1. In a process for conducting a Diels-Alder reaction by reacting a conjugated diolefin represented by the following structural formula:

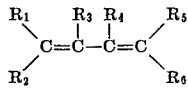

wherein $R_1$, $R_2$, $R_3$, $R_4$, $R_5$ and $R_6$ each represents a hydrogen atom, an alkyl group, an aryl group, an aralkyl group, an alkoxy group, an acyl group, or an oxycarbonyl group, with an olefin having an activated double bond represented by the following structural formula:

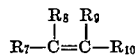

wherein $R_7$, $R_8$, $R_9$ and $R_{10}$ may be the same or different, $R_7$ represents an alkenyl group, an aryl group, an aralkyl group, an alkoxy group or a carbonyl-containing group and $R_8$, $R_9$ and $R_{10}$ each represents a hydrogen atom, an alkyl group, an alkenyl group, an aryl group, an alkoxy group or a carbonyl-containing group to form the Diels-Alder reaction product by the 1,4-addition of said olefin to said conjugated diolefin, the improvement of suppressing the formation of by-product thereby increasing the yield of the Diels-Alder reaction product which comprises feeding dividedly the conjugated diolefin or the olefin incrementally through at least two inlets into a tubular reactor.

2. The process according to claim 1, wherein dicyclopentadiene is reacted with butadiene to produce vinylnorbornene and tetrahydroindene.

3. The process according to claim 1, wherein said inlets are spaced along the length of the tubular reactor.

4. A process according to claim 1 wherein said reaction is conducted in the presenct of a polymerization inhibitor.

References Cited
UNITED STATES PATENTS

| | | | |
|---|---|---|---|
| 2,752,403 | 6/1956 | Schutze et al. | 260—666 PY |
| 2,752,406 | 6/1956 | Seyfried | 260—666 PY |
| 3,007,977 | 11/1961 | Hill et al. | 260—666 PY |

VERONICA O'KEEFE, Primary Examiner

U.S. Cl. X.R.

260—514, 593, 611, 666 A, 669